United States Patent
Toda et al.

(10) Patent No.: US 7,787,579 B2
(45) Date of Patent: Aug. 31, 2010

(54) FRAME SYNCHRONOUS CONTROL FOR USE IN A DSRC SYSTEM USING OPERATIONAL INFORMATION PROVIDED FROM INPUT CIRCUITRY OF AN ON-BOARD UNIT

(75) Inventors: Kentaro Toda, Tokyo (JP); Motoatsu Yoshikawa, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 600 days.

(21) Appl. No.: 11/878,332

(22) Filed: Jul. 24, 2007

(65) Prior Publication Data
US 2008/0025452 A1 Jan. 31, 2008

(30) Foreign Application Priority Data
Jul. 28, 2006 (JP) ............................. 2006-206674

(51) Int. Cl.
*H04L 7/06* (2006.01)
(52) U.S. Cl. .................. 375/364; 375/354; 375/368; 375/357; 375/365; 370/503; 370/514; 370/509
(58) Field of Classification Search ............... 375/364, 375/354, 368, 357, 365; 370/503, 251, 514, 370/509
See application file for complete search history.

(56) References Cited

U.S. PATENT DOCUMENTS

| | | | | |
|---|---|---|---|---|
| 6,009,131 A | * | 12/1999 | Hiramatsu | 375/354 |
| 6,275,552 B1 | * | 8/2001 | Ando | 375/368 |
| 6,317,441 B1 | * | 11/2001 | Nakajima | 370/509 |
| 6,625,125 B1 | * | 9/2003 | Hagiwara | 370/251 |
| 2001/0024948 A1 | * | 9/2001 | Yamashita | 455/352 |
| 2005/0220150 A1 | * | 10/2005 | Oyama | 370/503 |

FOREIGN PATENT DOCUMENTS

| | | |
|---|---|---|
| JP | 07-162406 | 6/1995 |
| JP | 2004-147016 | 5/2004 |

* cited by examiner

*Primary Examiner*—Eva Y Puente
(74) *Attorney, Agent, or Firm*—Studebaker & Brackett PC; Donald R. Studebaker

(57) ABSTRACT

A frame synchronous circuit operable in a dedicated short-range communication system, applicable to several modulation schemes, includes a UW detector for detecting a UW word from received data, an operation setting register group for specifying the operations of an on-board unit, a synchronous manager for controlling synchronization, an unlimited synchronization continuation register for maintaining the unlimited continuation of the synchronization, and an FCMC data analyzer for analyzing FCMC data. The operation setting register group can control synchronization by using not only operational information obtained from the FCMC data but also another operational information retrieved from an input device such as a CPU or terminal connected to the on-board unit. Consequently, debug and test operations can be performed without receiving any FCMC data.

11 Claims, 13 Drawing Sheets

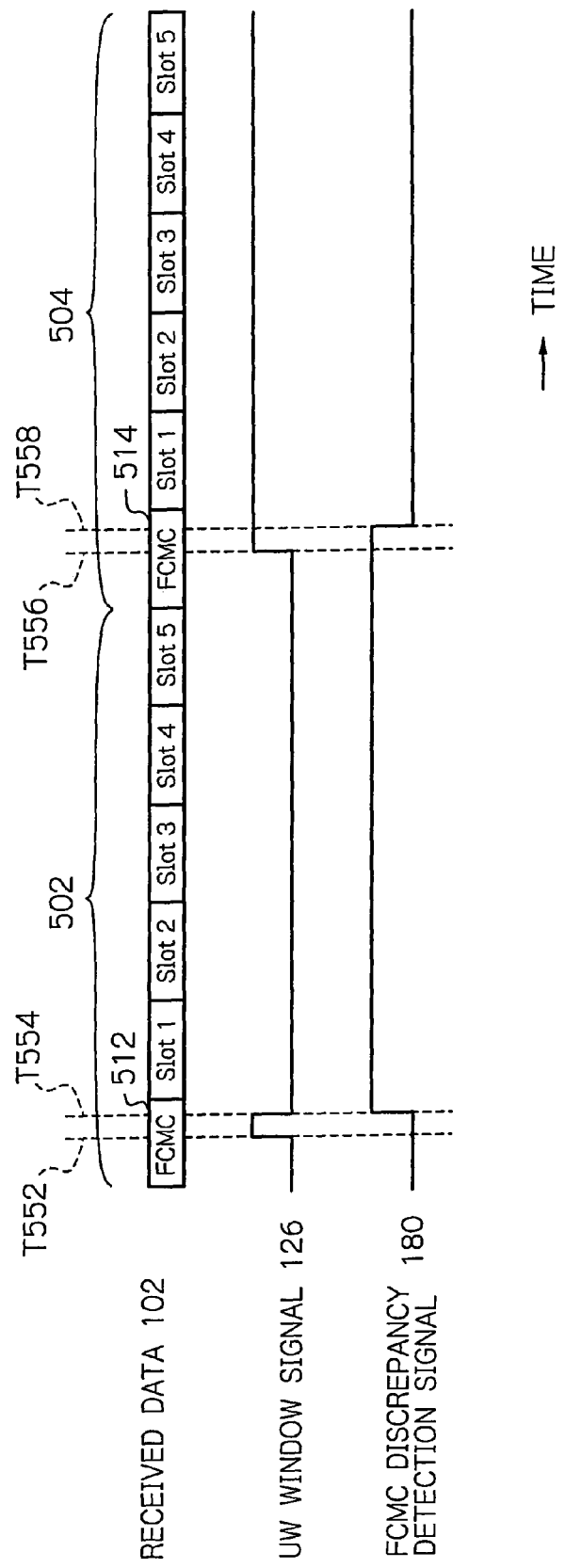

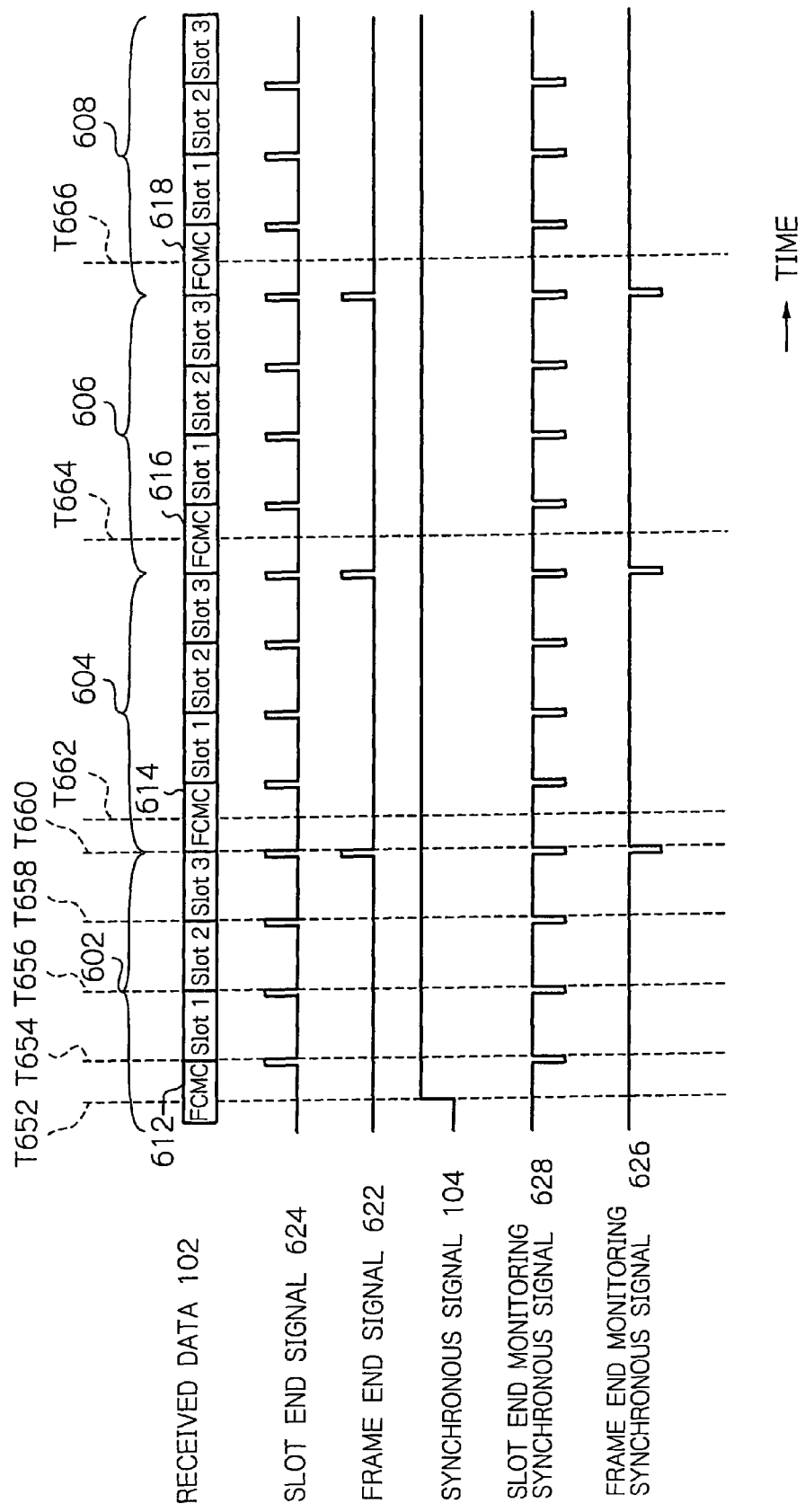

FRAME SYNCHRONOUS CONTROL FOR USE IN A DSRC SYSTEM USING OPERATIONAL INFORMATION PROVIDED FROM INPUT CIRCUITRY OF AN ON-BOARD UNIT

BACKGROUND OF THE INVENTION

1. Field of the Invention

The present invention relates to a frame synchronous circuit for a dedicated short-range communication (DSRC) system, and, in particular, for a DSRC system which accepts signal waves modulated with either an amplitude-shift keying (ASK) or quadrature phase shift keying (QPSK) scheme.

2. Description of the Background Art

In recent years, a roadside-vehicle communication system employing the DSRC system complying with a radio communication standard, such as the Standard ARIB STD-T75, has been developed, and by utilizing such a communication system, an ETC (Electronic Toll Collection) service has started. The Standard ARIB STD-T75, ver. 1.3, was issued on Nov. 30, 2005 for further enhancing the service and increasing the communication speed, in which two modulation schemes are mixed such that π/4 shift QPSK scheme is added to the modulation scheme used in the conventional ETC system, i.e. ASK scheme. Accordingly, as an ETC system employing the DSRC system uses the communication schemes of ASK and QPSK, an on-board unit or station needs to be capable of using both schemes in communication with roadside units or stations.

In the radio communication systems including PHSs (Personal Handyphone System) and cellular phone systems as well as the DSRC systems and the ETC systems employing the DSRC system, a data unit called frame is used. For example, the PHS system uses frames which are composed of 640-bit data. A frame transmitted from a transmitter end includes at its head a synchronous word, e.g. a unique word (UW) in the DSRC system. The on-board unit detects the synchronous word to establish synchronization with roadside units. In such systems, some of the roadside units transmit the frame data in the ASK and QPSK schemes in an alternate manner, i.e. transmit them in the time-sharing manner in which the UW data are different between the ASK frame and the QPSK frame.

However, while the on-board unit is in synchronization, there is a possibility that data identical with the UW data is included in a data stream being received. Therefore, in order to prevent resynchronization from being erroneously established when a data pattern similar to the synchronous word pattern is detected, during receiving a frame from which a synchronous word for establishing synchronization is detected, at a timing other than the timing when a synchronous word is to be transmitted in the beginning of the frame subsequent thereto, a technique called perch channel is applied.

Furthermore, due to a bad air condition, data including a synchronous word sent from a base station may be regarded erroneous as a result of a cyclic redundancy check (CRC). The on-board unit can therefore use an error-free technique for requesting the base station to retransmit the data. On this occasion, the on-board unit uses a synchronous protection technique for avoiding loss of synchronization even if the unit fails to receive frames continuously.

The perch channel technique and synchronization protection technique are used as known art for the communication system such as the ETC system which employs the ASK modulation scheme dedicatedly as its modulation scheme in which the transfer speed and the position of the synchronous word are uniquely determined.

Japanese patent laid-open publication No. 162406/1995 discloses a frame synchronous detection and protection circuit which employs a synchronous scheme that opens a window at a timing predicted to receive a frame synchronous signal in response to frames, which are different in length, transmitted in a time-sharing manner.

Another Japanese patent laid-open publication No. 2004-147016 discloses a receiver which can demodulate both ASK and QPSK modulation waves.

On-board equipment in the DSRC system, such as an ETC on-board unit, includes a conventional frame synchronous circuit. The on-board unit generally operates on receiving FCMC (Frame Control Message Channel) data from a roadside unit in communication with and analyzing the received data to decode commands from the roadside unit. However, such an on-board unit has a disadvantage that when the unit performs a debug or test operation, the unit has to receive the FCMC data and set the operation to be performed only for sending data.

In addition, when both of the ASK and QPSK modulation schemes are used together and the ASK frames and QPSK frames are transmitted in the time-sharing manner, the conventional frame synchronous circuit can detect UW words included in signals in the modulation scheme firstly synchronized therewith, but not respond to signal waves using the other scheme until the current synchronization is cancelled.

Furthermore, when frames different in number of time slots are transmitted in the time-sharing fashion and a synchronous word fails to be detected in the second frame, use of the perch channel technique results in failing to detect a synchronous word in the third frame, thus failing to appropriately proceed to the time-sharing process, resulting in inefficient communications.

In the conventional frame synchronous circuit, the above disadvantages are difficult to overcome since synchronization in a radio communication and perch channel control during maintaining synchronization would be complicated to the extent that the design and manufacturing costs are expensive.

The conventional circuit also cannot cancel the synchronization until the completion of a frame under reception. When the on-board unit goes out of the service area of the roadside unit in synchronization therewith, it often cannot complete the frame reception due to the decrease in the intensity of the radio waves. Moreover, when the on-board unit is in synchronization with one roadside unit, a perch window is not open at a timing interval with another roadside unit, so that it could not detect a UW word contained in data transmitted from the other roadside unit.

In some cases, even if the on-board unit incorporating the conventional frame synchronous circuit receives FCMC data containing a UW word from and successfully synchronizes with the roadside unit, the circuit may not operate properly due to possible discrepancies in the FCMC data. Nevertheless, the synchronization is kept, and thereby the on-board unit cannot establish synchronization with another roadside unit.

SUMMARY OF THE INVENTION

It is an object of the present invention to provide a frame synchronous circuit for a DSRC system, the circuit being incorporated in an on-board unit complying with the Standard ARIB STD-T75 and operable for performing debug and test operations without causing any problems in a circuit design and a software design.

It is another object of the present invention to provide a frame synchronous circuit for a DSRC system, the circuit being, with respect to synchronization control of a non-board unit complying with the Standard ARIB STD-T75 and to perch channel control during the continuous synchronization of the unit, capable of establishing stable and efficient synchronization between a roadside unit and the on-board unit even in the circumstances where both of the ASK and QPSK modulation schemes are used.

According to the present invention, a frame synchronous circuit for use in a dedicated short-range communication system applicable to a plurality of modulation schemes to transmit data between a roadside unit and a controlled device controls synchronization of the controlled device. The frame synchronous circuit comprises a synchronous word detector for detecting a synchronous word in data received from the roadside unit, an FCMC data analyzer for analyzing the received data to retrieve first operational information from FCMC data contained in the received data, an operation setting register group for setting the first operational information obtained in the FCMC data analyzer, and a synchronous manager for reading out the first information from the operation setting register group and for controlling a synchronous state. The synchronous manager is operative in response to the first operational information to generate a window signal for opening a window at a timing where the synchronous word is to be detected to supply the synchronous word detector with the generated signal. In response to the window signal, when the window is not open, the detector does not detect any synchronous words. In addition, the synchronous circuit includes input circuitry for receiving a control signal from a CPU which controls the controlled device or from a terminal provided to the circuit so as to control the synchronization using the control signal.

In addition to setting the operational information in the register group based on the received FCMC data, the frame synchronous circuit of the present invention is able to write the operational information directly from the CPU into the register group with the operation of the on-board unit freely specified. The synchronous circuit therefore can easily perform debug and test operations without retrieving FCMC data. Accordingly, it is advantageous to establish an environment for testing hardware or debugging software.

The frame synchronous circuit may be provided with an unlimited synchronization continuation circuit. Once the frame synchronous circuit synchronizes with input data including a UW word generated by a pulse generator during a test, the synchronization can be kept without receiving another FCMC data. Therefore, it is convenient to perform debug and test operations.

Alternatively, the frame synchronous circuit of the present invention may be configured to receive a forced synchronization mode signal input from the CPU or terminal to thereby establish synchronization forcibly. Consequently, the on-board unit can run a test such as verification or debug by itself, without using the pulse generator.

Furthermore, the frame synchronous circuit of the present invention may receive a synchronization cancellation signal input from the CPU or terminal when the radio intensity decreases or the received data is corrupt, there by canceling synchronization by means of software of a computer. Consequently, the on-board unit can go into a process of searching for another frequency and can find out a UW word transmitted from another roadside unit. In this way, efficient communication can be achieved.

The frame synchronous circuit also may receive a both-mode signal input from the CPU or terminal. When FCMC data in the QPSK and ASK waves are alternately transmitted from the roadside unit in the time-sharing manner, the synchronous circuit alternately selects the modulation scheme to be used for synchronization while opening a perch window in the other modulation signal, thereby enabling the transmission/receipt of the data in each modulation wave.

Furthermore, the frame synchronous circuit may receive a by-slot mode signal input from the CPU or terminal. On the occasion of receiving frame synchronous signals in the time-sharing manner, in which the frames are different in length depending on the modulation scheme, if a UW word is not detected from a frame at the position where the perch window in the currently synchronized scheme is open, the synchronous circuit opens a perch window slot by slot in that frame to thereby prevent the loss in the detection of another UW word in the currently synchronized scheme. Consequently, the loss in transmission of the frames can be reduced. Moreover, no perch window is open at an unnecessary timing, so that erroneous resynchronization is prevented when data having the same bit pattern as a UW pattern is received.

In addition, when the frame synchronous circuit of the present invention detects any discrepancies in the contents of the received FCMC data, the synchronous circuit cancels the synchronization by assuming that the synchronization is lost and then opens a perch window in both schemes of ASK and QPSK. The synchronous circuit can thus transfer to detect a next communication device, i.e. another roadside unit, without a loss.

The frame synchronous circuit of the present invention may comprise a monitor circuit so as to output a monitor signal such as frame end and slot end monitor signals under synchronization. It simplifies monitoring these signals, and therefore the debug operation on software and test operation on the circuitry become easier.

BRIEF DESCRIPTION OF THE DRAWINGS

The objects and features of the present invention will become more apparent from consideration of the following detailed description taken in conjunction with the accompanying drawings in which:

FIG. 13 is a timing chart useful for understanding an operational example of the frame synchronous circuit shown in FIG. 12; and FIG. 14 is a timing chart useful for understanding an operational example of an eighth embodiment of the frame synchronous circuit in accordance with the present invention.

DESCRIPTION OF THE PREFERRED EMBODIMENTS

With reference to the accompanying drawings, preferred embodiments of the frame synchronous circuit of the present invention used for a dedicated short-range communication (DSRC) system will now be described in detail.

Figure 1:
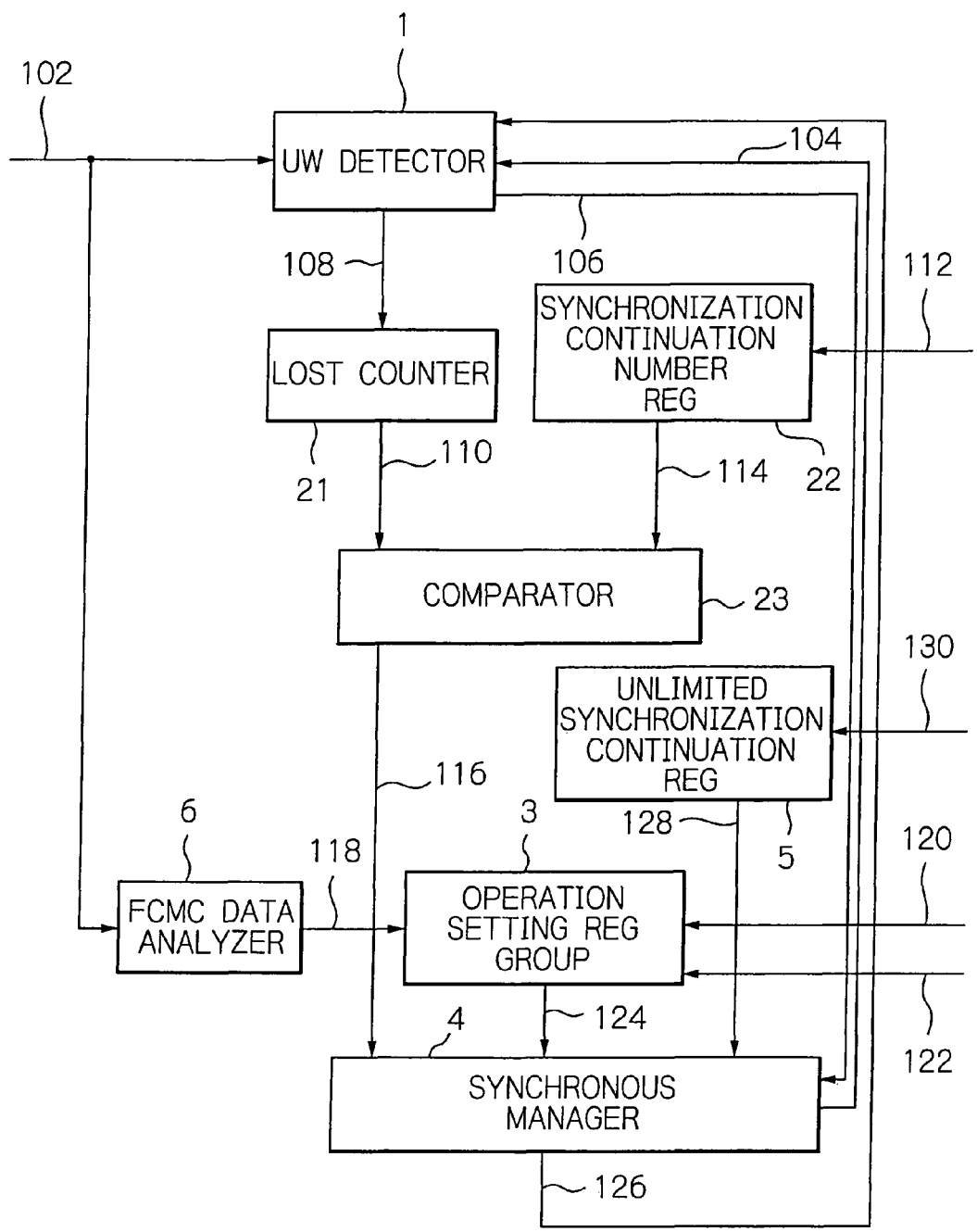
FIG. 1 is a schematic block diagram showing a first embodiment of a frame synchronous circuit for DSRC system in accordance with the present invention.

FIG. 1 shows a first embodiment of a frame synchronous circuit 10 which includes a Unique Word (UW) detector 1 for detecting a synchronous word such as UW word contained in a received data stream, a lost counter 21 for counting up the number of data frames in which UW words are not detected, a synchronization continuation number register 22 for storing the number of times that the synchronization is continued, a comparator 23 for comparing the obtained value, i.e. count, in the lost counter 21 with the value contained in the register 22 to output a resultant instruction signal indicative of the loss of synchronization, an operation setting register group 3 for setting operations of an on-board unit, a synchronous manager 4 for controlling a synchronous state, an unlimited synchronization continuation register 5 for maintaining the unlimited continuation of the synchronization, and an FCMC (Frame Control Message Channel) data analyzer 6, which are interconnected as illustrated.

The frame synchronous circuit 10 is used in a DSRC system which complies with the Standard ARIB STD-T75, in particular, incorporated into DSRC on-board equipment, i.e. an ETC (Electronic Toll Collection) on-board unit or station so as to be adaptive to various modulation schemes in receiving data, e.g. amplitude-shift keying (ASK) or quadrature phase shift keying (QPSK) scheme. When such an ETC on-board unit receives data transmitted by radio from a roadside unit or station, not shown, the circuit 10 detects the frame synchronization in the data. In the illustrative embodiment, the circuit 10 connects with a central processing unit (CPU), not shown, for controlling the on-board unit, and the CPU controls the operations of the on-board unit.

The frame synchronous circuit 10 may be of the type of establishing synchronization at the time where the UW detector 1 detects a UW word or of the type of establishing synchronization at the time a cyclic redundancy check (CRC) on FCMC data is succeeded.

The synchronous circuit 10 is configured with input means or circuitry, not shown, for inputting or receiving a control signal especially by the CPU or via a terminal provided to the circuit 10 so as to control synchronism using data other than the FCMC data.

The UW detector 1 is adapted to input data 102 sent from the roadside unit and a synchronous signal 104 from the synchronous manager 4, and then outputs a synchronous detection signal 106, on the basis of the input data or signal, to the synchronous manager 4. Signals are thus designated with reference numerals of connections on which they are conveyed. When receiving the synchronous signal 104, when representing a synchronism, the UW detector 1 determines whether or not a UW word is contained in the received data 102 to detect the UW word, whereas upon receiving the signal 104, when representing synchronism, the detector 1 detects a UW word at the timing that a UW word contained in a subsequent frame is delivered.

Furthermore, the detector 1 is adapted to generate the synchronous detection signal 106 as a result of detecting the UW word to deliver the signal 106 to the synchronous manager 4. For example, if the detector 1 detects the UW word in the received data 102, the detector 1 generates the synchronous detection signal 106 representing "True", or else it generates the signal 106 representing "False".

The UW detector 1 advantageously detects UW words at frame intervals after the establishment of synchronization. If the expected UW word is not detected in the beginning of the next frame, the detector 1 delivers a UW lost signal 108 to the lost counter 21. The detector 1 does not detect a UW word when a window is not open in response to a UW window signal 126 derived from the synchronous manager 4.

The lost counter 21 is configured to count up the input UW lost signals 108 to thereby output a count value 110 to the comparator 23.

The synchronization continuation number register 22 is adapted to set the number of times of delivery of the UW lost signals 108 for outputting a synchronization lost signal 116, that is, defines the number of times of continuous synchronization. The register 22 may be designed to define synchronization-continuous number 112 by an inputting means such as the CPU or terminal of the system.

The comparator 23 is configured to compare the counter value 110 in the lost counter 21 with a register value 114 in the synchronization continuation number register 22 to thereby deliver the resultant synchronization lost signal 116 to the synchronous manager 4. The comparator 23 sends out to the manager 4 the lost signal 116 indicative of, for instance, "True" when the counter value 110 is larger than the register value 114, otherwise sends the signal 116 indicative of "False".

The operation setting register group 3 is adapted to set the operational information of an on-board unit, which is generally operational information 118 based on FCMC data sent from the FCMC data analyzer 6. The register group 3 of the illustrative embodiment can be controlled by the CPU connected to the on-board unit. More specifically, into the register group 3, operational information 120 can be written directly by the CPU or terminal. The register group 3 may restrict the CPU to write information therein when the frame synchronous circuit 10 is in a synchronous state.

In addition, the operation setting register group 3 is operative in response to a CPU control mode set signal 122 indicating that whether or not the register group 3 accepts control of the CPU. For example, if the set signal 122 is "False", then the register group 3 is set to a normal control mode for setting the operational information 118 based on the FCMC data. If the signal 122 is "True", the register group 3 is set to the CPU control mode for setting the operational information 120 by the CPU, that is to say, accepting control of the CPU.

The synchronous manager 4 has a function for adjusting the counter of the on-board unit to air timing and a function for generating a UW window signal based on a counter value resulting from the adjustment. The air timing is defined as originating at the position of an antenna of the on-board unit and cancelling delay encountered in the circuitry. In the synchronous circuit 10, it is necessary to set the counter value in the on-board unit by taking account of the circuitry delay time during synchronization, and start transmitting data by taking account of a delay in a transmitter circuit during transmission.

If such delays were not considered, the timing would be offset between transmitting and receiving data correspondingly to the circuitry delay so that the timing between the on-board unit and the roadside unit goes off, thereby disabling radio communication between the on-board and roadside units. For preventing the delay in the transmission and reception, the synchronous manager 4 is provided to adjust the air timing.

The synchronous manager 4 reads out operational information 124 from the operation setting register group 3 so as to generate, based on the information 124, a UW window signal 126 which is in turn delivered to the UW detector 1. The manager 4 may generate the UW window signal 126 that changes between, such as, logical "1" and "0", one of which indicates an opened state and the other a closed state. In the illustrative embodiment, the manager 4 generates the signal 126 such that "0" represents the opened state and "1" represents the closed state.

The manager 4 can estimate the detection timing of the UW word on the basis of the operational information 124 to thereby open a perch window at each detection timing, i.e. generate the UW window signal 126 indicative of "0". The manager 4 outputs the UW window signal 126 to the UW detector 1 so as to prevent false detection of data having the same bit pattern with the UW word contained in the received data when the UW window signal 126 does not represent the opened state.

The synchronous manager 4 has, for example, a counter for counting the received bits and another counter for counting time slots involved in the received data 102. Furthermore, the manager 4 retrieves as the operational information 124 the number of received bits per slot and the number of slots per frame to specify the received bits measuring up to the obtained number of bits as the ending time of a time slot and also specify the slots measuring up to the obtained number as the ending time of a frame, thereby estimating a detection timing of the UW word.

Furthermore, when the synchronous circuit 10 is in synchronization, the manager 4 may generate a window signal in a modulation scheme in such a way that the perch window is open for each frame regardless of whether or not a UW word is detected.

The synchronous manager 4 generates the synchronous signal 104 in response to the synchronous detection signal 106 fed by the UW detector 1 and supplies the generated signal to the UW detector 1. The manager 4 may generate the synchronous signal 104 that changes to, for instance, "1" or "0", one of which representing a synchronous state and the other an asynchronous state. When the synchronous detection signal 106 is "True", the manager 4 changes the synchronous signal 104 into the synchronous state, and when the detection signal 106 is "False", changes the signal 104 into the asynchronous state.

The manager 4 also inputs the synchronization lost signal 116 from the comparator 23. If the input signal 116 is indicative of a loss of synchronization, the manager 4 changes the synchronous signal 104 to the asynchronous state to thereby open the perch windows of the UW window signals 126 in both of the QPSK and ASK modulation schemes.

Furthermore, the manager 4 receives an unlimited synchronization continuation signal 128 from the unlimited synchronization continuation register 5. When the signal 128 indicates that the continuation of synchronization is not limited, the manager 4 does not change the synchronous signal 104 into the asynchronous state.

The synchronization continuation register 5 is operable to maintain the unlimited continuation of synchronization and is adapted to be set up via an input means such as the CPU or terminal of the system. For example, the register 5 is configured by inputting via the CPU or terminal a signal 130 which represents whether or not the continuation of synchronization is to be unlimited.

The FCMC data analyzer 6 is dedicated to analyze FCMC data included in the data 102, which the on-board unit received from the roadside unit, and obtain the operational information 118 contained in the FCMC data to set the information to the operation setting register group 3. The analyzer 6 may be intended for retrieving from FCMC data 102 the operational information 118 regarding, e.g. timing that data are to be transmitted from, the number of slots and timing in sending data.

With the configuration described above, in operation such as test or analysis other than the actual, i.e. on-line operation, if the frame synchronous circuit 10 receives, when the operational setting register group 3 is in the CPU control mode, data having a UW word only once to be brought into synchronization, then writing of the operational information 120 into the register group 3 from the CPU under synchronization allows data transmitted in any frame structures to be dealt with based on the thus written information.

More specifically in accordance with the illustrative embodiment, in operation other than the on-line operation, if data including a UW word is generated by a UW generator such as a signal generator to render the synchronous circuit 10 once establish synchronization, it is then possible to optionally set the operation of the on-board unit via the CPU connected thereto even hen there is no device or station corresponding to the roadside unit for transmitting the FCMC data.

Hereinafter, the operation of the first embodiment of the frame synchronous circuit 10 will be described. In the DSRC system of the illustrative embodiment, the frame synchronous circuit 10 incorporated in the ETC on-board unit receives data transmitted from the roadside unit. For instance, the transmitted data 102 includes, in order, "FCMC", "Slot 1", "Slot 2" . . . and "Slot n", where n is a natural number. These are collectively referred to as a frame.

The received data 102 is determined as to whether it is the FCMC data or data for communicating with another on-board unit in such a manner that the UW detector 1 detects in the received data 102 a bit pattern called unique word which is to be present in the beginning of the FCMC data. As a result of detection of the UW word, the synchronization is detected.

In the illustrative embodiment, when the on-board unit is not synchronous with the roadside unit, the synchronous manager 4 generates the UW window signal indicating the opened state, and thus the on-board unit goes on its standby mode until FCMC data including a UW word in its head portion is transmitted to the on-board unit. This is because that when data with the same bit pattern as UW data is detected in the received data 102 while the UW window signal is indicative of the closed state, the detected data is considered to be a part of the received data stream, and therefore no synchronization operation is performed.

When the UW detector 1 detects the synchronization upon detecting the UW word in the received data 102, the detector 1 supplies the manager 4 with the synchronous detection signal 106 which represents "True".

As described above, after the detection of the UW word and synchronization, the FCMC data analyzer 6 analyzes the received FCMC data for retrieving the operational information 118, concerning such as timing that the data are to be transmitted from, the number of time slots and timing in sending data, so as to set the information to the operation setting register group 3. In this way, the on-board unit can be operated by determining the operational information set in the register 3.

Further, in the illustrative embodiment, values indicative of the operational information 120 are written into the register group 3 by the CPU, that is, the CPU specifies the operation to be performed to thereby operate the on-board unit even when the FCMC data is not obtained from the roadside unit.

In general, the on-board unit repeatedly receives FCMC data at the timing set in the register group 3 based on the FCMC data. More specifically, when the reception of the data for one frame is completed, the next operation is performed by assuming that another FCMC data is to be transmitted. Otherwise, the synchronization would be lost. In the illustrative embodiment, the frame synchronous circuit 10 includes the unlimited synchronization continuation register 5, so that if the circuit 10 detects the synchronization only once, the circuit 10 can maintain the synchronization without receiving FCMC data. Accordingly, once the circuit 10 is input with a UW-included data generated by a UW generator such as a pulse generator and detects the UW word during operations, such as test and analysis, other than actual operation, the circuit 10 can maintain the synchronization without limitation.

Figure 2:
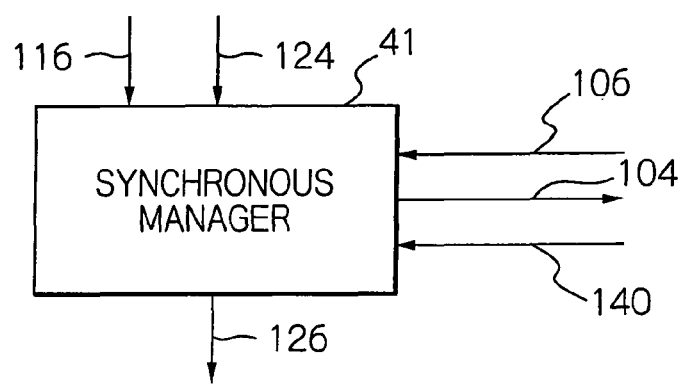
FIG. 2 is a schematic block diagram showing a synchronous manager of a second embodiment of the frame synchronous circuit in accordance with the present invention.

FIG. 2 shows an alternative, second embodiment of the frame synchronous circuit 10, in which the configuration of the circuit 10 may be almost the same as that of the first embodiment except the following points. As seen from FIG. 2, the synchronization manger 4 of the first embodiment is replaced by a synchronous manager 41 having a function of forced synchronization establishing means to which a forced synchronization mode signal 140 is input. Furthermore, the unlimited synchronization continuation register 5 is removed. Incidentally, the repetitive descriptions of the constituent elements corresponding to those of the first embodiment will be omitted.

The frame synchronous circuit 10 is operable to receive the predetermined forced synchronization mode signal 140 input by an input means such as the CPU or terminal of the system. The synchronous circuit 10 may store the received signal 140 into an internal register, not shown.

The synchronous manager 41 of the alternative embodiment derives the forced synchronization mode signal 140 from the internal register or terminal. If the forced synchronization mode signal indicates "True", for example, then the manager 41 forces the on-board unit into synchronization regardless of receiving the synchronous detection signal 106 or synchronization lost signal 116, i.e. regardless of whether or not a UW word is detected, thereby generating the synchronous signal 104 indicative of "True" to deliver the generated signal to the UW detector 1.

During operations, such as test or analysis, other than the on-line operation, if the manager 41 is input with the forced synchronization mode signal 140 to force the on-board unit into synchronization, and causes the CPU control mode set signal 122 to set the operation setting register group 3 in the CPU control mode with the operational information being written into the register group 3 directly from the CPU or terminal, then the synchronous circuit 10 is responsive to the written information to be able to handle data transmitted in any types of frame structure.

Furthermore, as the synchronous manager 41 in the alternative embodiment is input with the signal 140 via the CPU or terminal connected thereto, such system configuration accomplishes the forced synchronization without changing the design of the circuits provided to the conventional frame synchronous circuit, such as the UW detector 1, and their manufacturing process.

Figure 3:
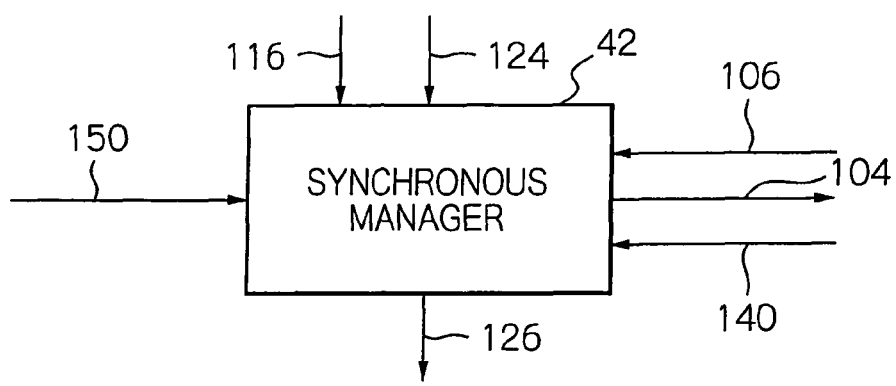
FIG. 3 is a schematic block diagram showing a synchronous manager of a third embodiment of the frame synchronous circuit in accordance with the present invention.

FIG. 3 shows a further alternative, third embodiment of the frame synchronous circuit 10, in which the configuration of the circuit 10 may be almost the same as that of the second embodiment except the following points. As seen from FIG. 3, the synchronization manger 41 of the second embodiment is replaced by a synchronous manager 42 having a function of forced synchronization canceling means to which a synchronization cancellation signal 150 is input. The repetitive descriptions of the constituent elements corresponding to those of the second embodiment will be omitted.

The frame synchronous circuit 10 is operable to receive the predetermined synchronization cancellation signal 150 input by an input means such as the CPU or terminal of the system. The synchronous circuit 10 may store the received signal 150 into an internal register, not shown.

The synchronous manager 42 of the alternative embodiment derives the synchronization cancellation signal 150 from the internal register or the terminal. If the synchronization cancellation signal 150 represents "True", for example, then the manager 42 forcedly cancels synchronization of the on-board unit regardless of receiving the synchronous detection signal 106 or synchronization lost signal 116, i.e. regardless of whether or not a UW word is detected, thereby generating the synchronous signal 104 indicative of "False" and delivering the latter to the UW detector 1.

In the alternative embodiment, the CPU, for example, may be adapted to determine the received data. If the determined data is incorrect due to, e.g. a bad air reception condition or corruption of the data itself, the synchronization cancellation signal 150 representing "True" is preferably supplied to the manager 42.

Furthermore, in the illustrative embodiment, if the on-board unit is in synchronization, not only during the test operation or the like, the synchronization can be cancelled by inputting the cancellation signal 150 without making the UW window signal in the open state. Consequently, the on-board unit can be brought into a process of searching for a new frequency.

Figure 4:
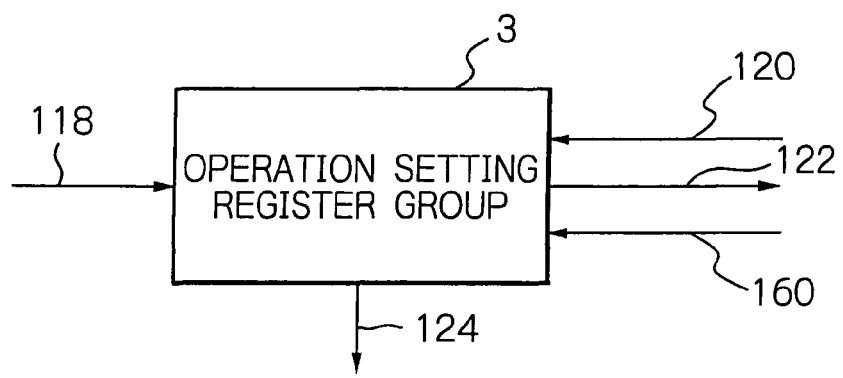
FIG. 4 is a schematic block diagram showing an operation setting register group of a fourth embodiment of the frame synchronous circuit in accordance with the present invention.

FIG. 4 shows a still further alternative, fourth embodiment of the frame synchronous circuit 10, of which the configuration may be similar to that of any of the first, second and third embodiments. Its detailed description will therefore be made with reference to the circuitry of the first embodiment. Incidentally, the repetitive descriptions of the constituent elements corresponding to those of the first embodiment will be omitted.

The frame synchronous circuit 10 is, specifically in the instant alternative embodiment, adapted to receive a both-mode signal input by an input means such as the CPU or terminal of the system. The circuit 10 may store the received both-mode signal in an internal register such as a both-mode register, not specifically depicted. The synchronous circuit 10 is preferably set in the both-mode by the CPU when powered on.

The operation setting register group 3 of the instant alternative embodiment is set by, as shown in FIG. 4, writing a both-mode signal 160 thereinto via the both-mode register or the terminal. Furthermore, when the synchronous manager 4 generates the UW window signal 126 based on the operational information 124 read out from the register group 3, the manager 4 reads out, e.g. the both-mode signal as the information 124. Then, if the both-mode signal represents "True" and the on-board unit is in synchronization, then the manager 4 synchronizes with the air timing in the modulation scheme of the signal in synchronization with, while opening a perch window with respect to a modulation scheme not in synchronization therewith to generate the UW window signal 126 accordingly.

Figure 5:
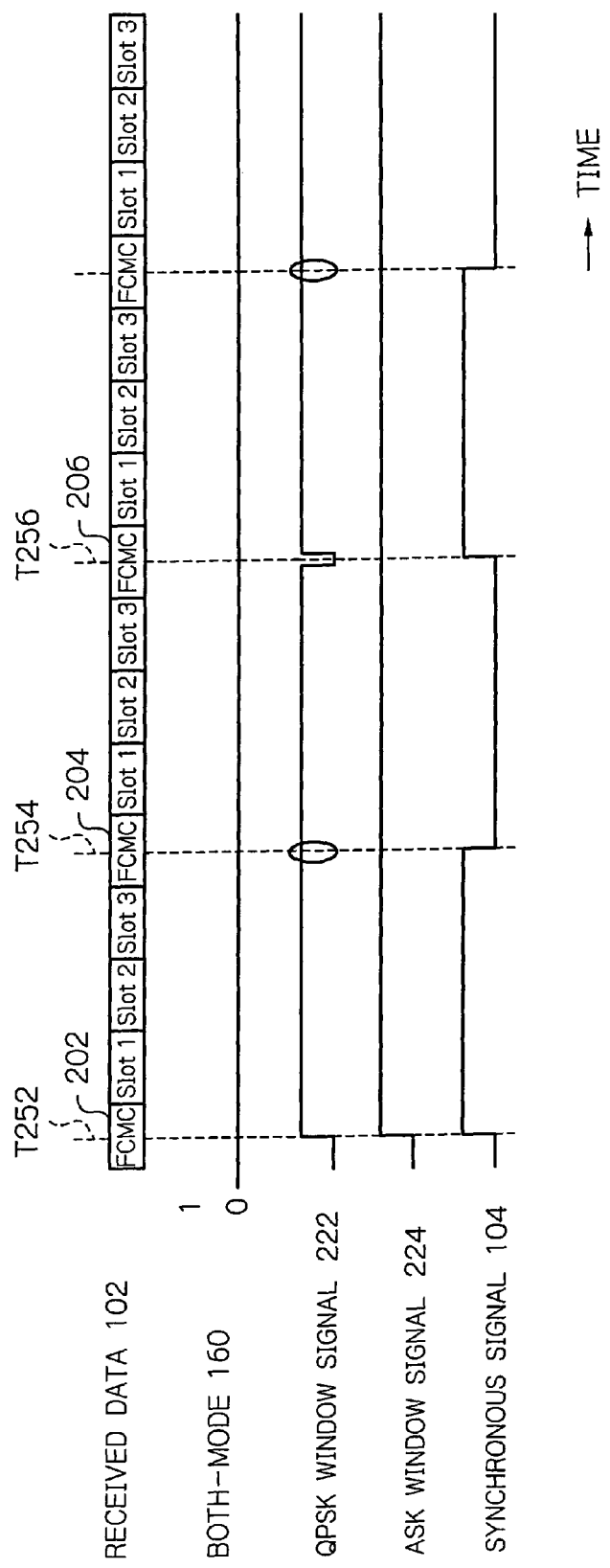
FIGS. 5 and 6 are a timing chart useful for understanding an operational example of the frame synchronous circuit shown in FIG. 4.

In accordance with the present alternative embodiment of the frame synchronous circuit 10 in the DSRC system, an operation for generating a UW window signal when the both-mode is not set will now be described with reference to a timing chart shown in FIG. 5.

In this alternative embodiment, the synchronous circuit 10 alternately receives data 102 which have respective frames in the QPSK and ASK modulation schemes in the time-sharing manner. The number of time slots both in the QPSK and ASK schemes is assumed three herein. Generated as the UW window signals 126 in the circuit 10 are a window signal 222 in the QPSK scheme and a window signal 224 in the ASK scheme.

The on-board unit incorporating the circuit 10 first receives FCMC data 202 in the QPSK scheme. Then a UW word of the received data 202 is detected at a time T252, so that the on-board unit goes into synchronization in the QPSK scheme.

Furthermore, the FCMC data analyzer 6 analyzes the FCMC data 202 so as to set to the operation setting register group 3 the operational information 118 concerning such as the number of slots and a time-sharing mode indicating whether or not the data are transmitted in time-sharing manner.

At this time, the synchronous manager 4 reads out the operational information 124 in the register group 3 to generate the UW window signal 126 on the basis of the information 124. Since only the operational information in the QPSK scheme has been set to the register group 3, the manager 4 generates the QPSK window signal 222 in which a perch window is open. That is, the signal 222 indicates the open state at the QPSK UW detection timing T252. However, the UW window signal 224 in the ASK scheme does not indicate the open state at any timing.

Consequently, even if the UW detector 1 detects data with the bit pattern corresponding to that of a UW word from the ASK FCMC data 204 at a time T254, which is an ASK UW detection timing, the signal 224 is not open. The detector 1 therefore does not detect the UW word, so that the manager 4 cannot change the present scheme of synchronization to the ASK scheme. At this time, the detector 1 also supplies the synchronous manager 4 with the synchronous detection signal 106 indicating that no UW word is detected. The manager 4, in turn, generates the synchronous signal 104 in the asynchronous mode and outputs it to the UW detector 1.

At a time T256, which is a QPSK UW detection timing, the UW window signal 222 in the QPSK scheme is indicative of the open state, i.e. the signal 222 represents "0", and then the UW detector 1 detects data with the bit pattern corresponding to that of a UW word from the QPSK FCMC data 206 to determine the UW word, and thereby the synchronous scheme is reestablished in the QPSK scheme.

As described above, in the normal operation in which the both-mode is not set, once the synchronous circuit 10 detects the synchronization in a certain modulation scheme, the circuit 10 then detects resynchronization at each UW detection timing in the same modulation scheme.

Figure 6:
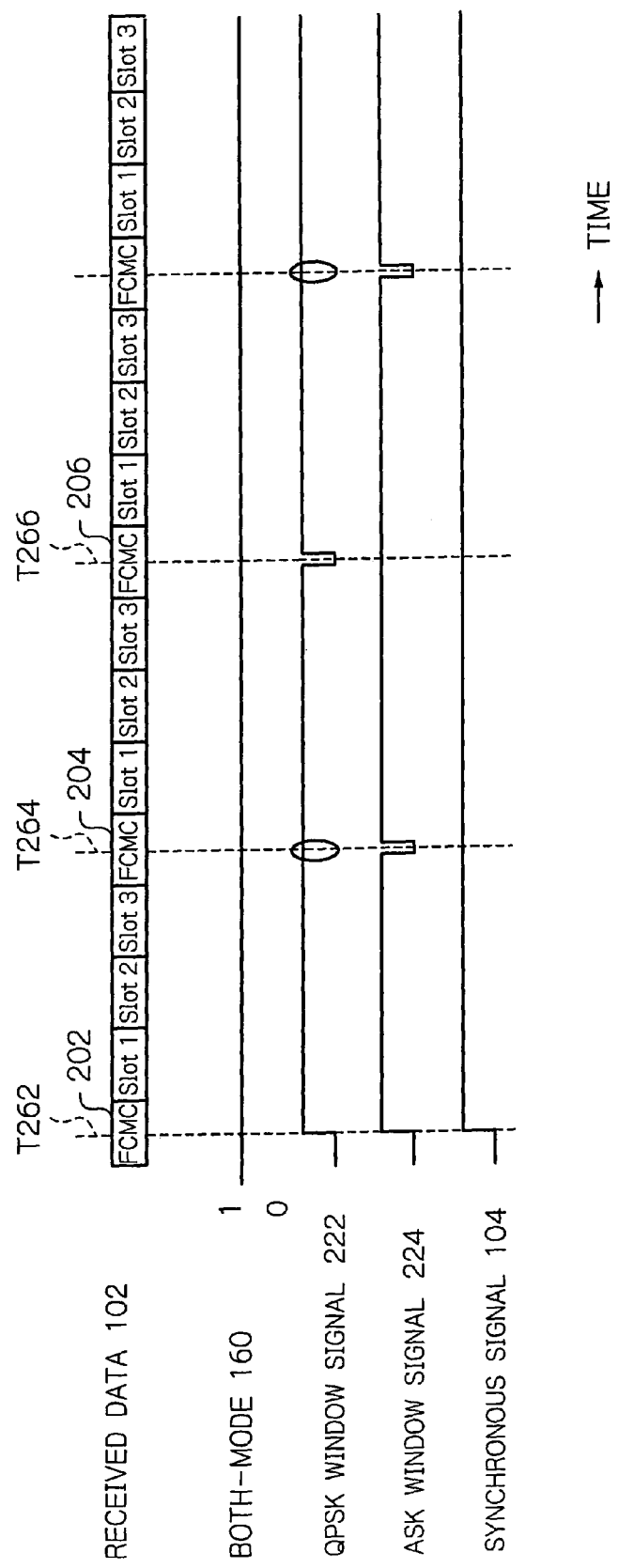

In accordance with the instant alternative embodiment of the frame synchronous circuit 10 in the DSRC system, an operation for generating a UW window signal when the both-mode is set will now be described with reference to a timing chart shown in FIG. 6. Hereinafter, it is assumed that the both-mode is set in the operation setting register group 3 via the CPU or terminal.

In this operational example, the synchronous circuit 10 receives data similar to that in the aforementioned example where the both-mode is not set. The synchronous circuit 10 therefore establishes synchronization in the QPSK scheme at a time T262 in response to the QPSK FCMC data 202, and then the operational information 124 obtained by analyzing the data 202 is set to the register group 3.

Furthermore, the synchronous manager 4 generates, as in the case where the both-mode is not set, the QPSK UW window signal 222 on the basis of the operational information 124 of the register group 3 in such a way that a perch window is open at the UW detection timing T262.

Since the both-mode is set in the present alternative embodiment, the UW window signal 224 in the ASK scheme is generated such that a perch window is open at a subsequent UW detection timing in the ASK scheme. Here, the perch window is open at a UW detection timing T264 where one frame corresponding to the number of received bits and slots specified in the QPSK operational information 124 is passed.

For example, when the synchronous circuit 10 alternately receives QPSK frames and ASK frames in the time-sharing manner, the synchronous manager 4 can once establish synchronization in the QPSK scheme to adjust the bit counter of the received data to the air timing and thereby estimate the detection timing T264 so far as the subsequently received ASK frame has the length substantially equal to that of the QPSK frame.

Consequently, if the UW detector 1 detects data with a bit pattern corresponding to a UW pattern from the ASK FCMC data 204 at the time T264, which is the ASK UW detection timing, then the detector 1 detects the UW word because the ASK UW window signal 224 is open, and therefore the current scheme of synchronization is changed to the ASK scheme. At this time, the UW detector 1 supplies the synchronous manager 4 with the synchronous detection signal 106 indicating the detection of the UW word, and the manager 4, in turn, generates the synchronous signal 104 in the synchronous state to output it to the detector 1.

Furthermore, at a time T266 which is a QPSK UW detection timing, the UW window signal 222 in the QPSK scheme is indicative of the open state, and therefore the UW detector 1 detects data with the bit pattern corresponding to that of the UW word to determine a UW word from the QPSK FCMC data 206, and thereby the scheme of synchronization is changed to the QPSK scheme again.

Accordingly, in the both-mode operation in which the both-mode 160 is set, a perch window in a different modulation scheme can be open after the detection of synchronization in a certain modulation scheme. Consequently, regardless of whether or not the scheme of the later signal is the same as the scheme of the current synchronization, the modulation scheme for the synchronization can be switched to that of subsequent data from where a UW can be detected.

When the data 102 containing QPSK or ASK frames are alternately transmitted in the time-sharing manner, the QPSK data is normally transmitted first, so that the QPSK modulation scheme has precedence over the ASK scheme. When the both-mode 160 is set, the illustrative circuit 10 can generate the UW window signal 126 in such a way that a perch window is open at every UW detection timing in the different modulation schemes, thereby detecting the UW word and changes the schemes of synchronization.

Figure 7:
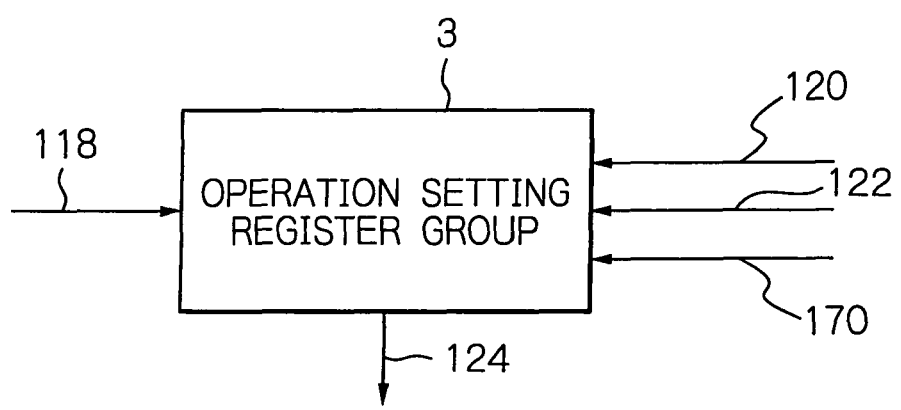
FIG. 7 is a schematic block diagram showing an operation setting register group of a fifth embodiment of the frame synchronous circuit in accordance with the present invention.

FIG. 7 shows a still another alternative, fifth embodiment of the frame synchronous circuit 10, of which the configuration may be similar to that of any of the first, second and third embodiments. Its detailed description will therefore be described with reference to the circuitry of the first embodiment. Incidentally, the repetitive descriptions of the constituent elements corresponding to those of the first embodiment will be omitted.

The frame synchronous circuit 10 is, specifically in the instant alternative embodiment, adapted to receive a by-slot mode signal input by an input means, such as the CPU or terminal of the system. The circuit 10 may store the received by-slot mode signal in an internal register such as a by-slot mode register, not specifically shown.

The operation setting register group 3 of this alternative embodiment is set by, as shown in FIG. 7, writing a by-slot mode signal 170 there into via the by-slot mode register or the terminal. Furthermore, when the synchronous manager 4 generates the UW window signal 126 based on the operational information 124 read out from the register group 3, the manager 4 reads out, e.g. the by-slot mode signal carrying the information 124. If the value in the synchronization continuation number register 22 is "1" or more and the by-slot mode signal represents "True", then the manager 4 establishes synchronization upon receiving a predetermined FCMC data to thereby generate the UW window signal 126 in which a perch window is open at the time when the defined number of slots pass on, i.e. at the UW detection timing. However, if a UW word cannot be detected at this timing, the manager 4 generates the window signals 126 in which the perch window is open in every slot until the next UW word can be detected.

Figure 8:
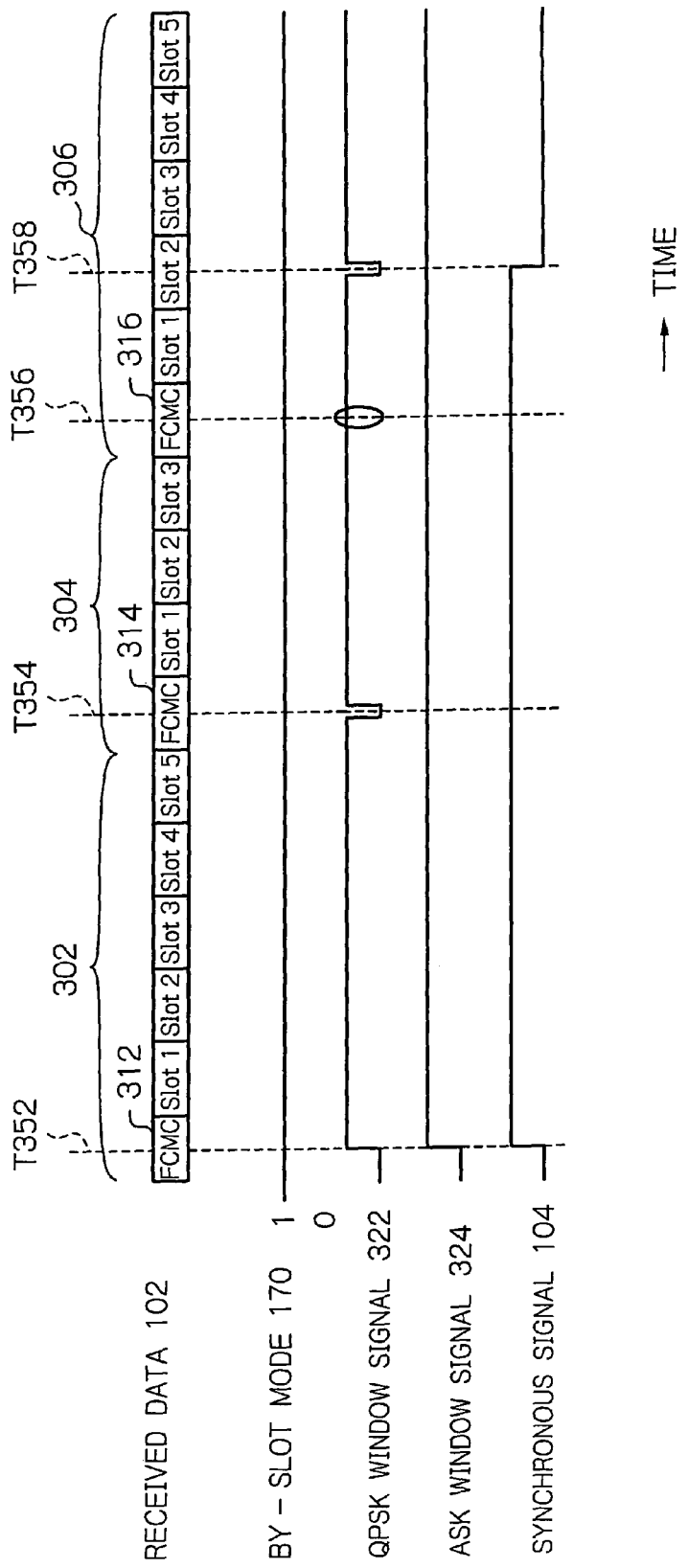
FIGS. 8 and 9 are a timing chart useful for understanding an operational example of the frame synchronous circuit shown in FIG. 7.

In accordance with the illustrative embodiment of the frame synchronous circuit 10 in the DSRC system, an operation for generating a UW window signal when the by-slot mode is not set will now be described with reference to a timing chart in FIG. 8.

To the synchronous circuit 10, the data stream 102 containing time-shared frames is transmitted from the roadside unit, in which the length of each frame is different. For example, five-slot frame 302 and three-slot frame 304 are transmitted alternately. In the alternative embodiment, the circuit 10 receives the frames 302 and 304 alternately in the QPSK modulation scheme, there by generating as the UW window signals 126 a QPSK window signal 322 and an ASK window signal 324.

The on-board unit incorporating the circuit 10 first receives FCMC data 312 in the predetermined frame 302. Then a UW word of the received data 312 is detected at a time T352, and the on-board unit thus goes into synchronization. Furthermore, the FCMC data analyzer 6 analyzes the FCMC data 312 so as to set in the operation setting register group 3 the operational information 118 in which the time-sharing mode is "True" and the number of slots is five.

At this time, the synchronous manager 4 reads out the operational information 124 in the register group 3 to generate the UW window signal 126 on the basis of the information 124. Since the register group 3 has been set with the operational information in the QPSK scheme but not to the by-slot mode, the manager 4 generates, based on the information 124, the QPSK window signal 322 in which a perch window is open. However, the ASK window signal 324 does not indicate the open state. In the QPSK window signal 322, a perch window is brought open at each of the timings when all of the slots occur which are defined in number by the information 124.

In regard to the QPSK window signal 322, if a UW word cannot be detected from FCMC data 314 in the frame 304 at a timing T354 where a perch window is open next time, the data 314 is not analyzed. Thus the operational information on the frame 304 is not set in the register group 3. In this time, even though the frame 304 actually includes three slots, the number of slots set in the register group 3 is five, so that the QPSK window signal 322 is generated such that the perch window is open after five slots pass on. Consequently, the perch window in the QPSK window signal 322 cannot be open at a proper UW detection timing T356 in a next frame 306, but is open at a wrong timing T358.

Accordingly, by the use of such signal 322 where the perch window is open at the wrong timing T358, a false detection of the UW word occurs, i.e. a UW word which is not to be detected may be detected instead of a UW word to be detected.

Figure 9:
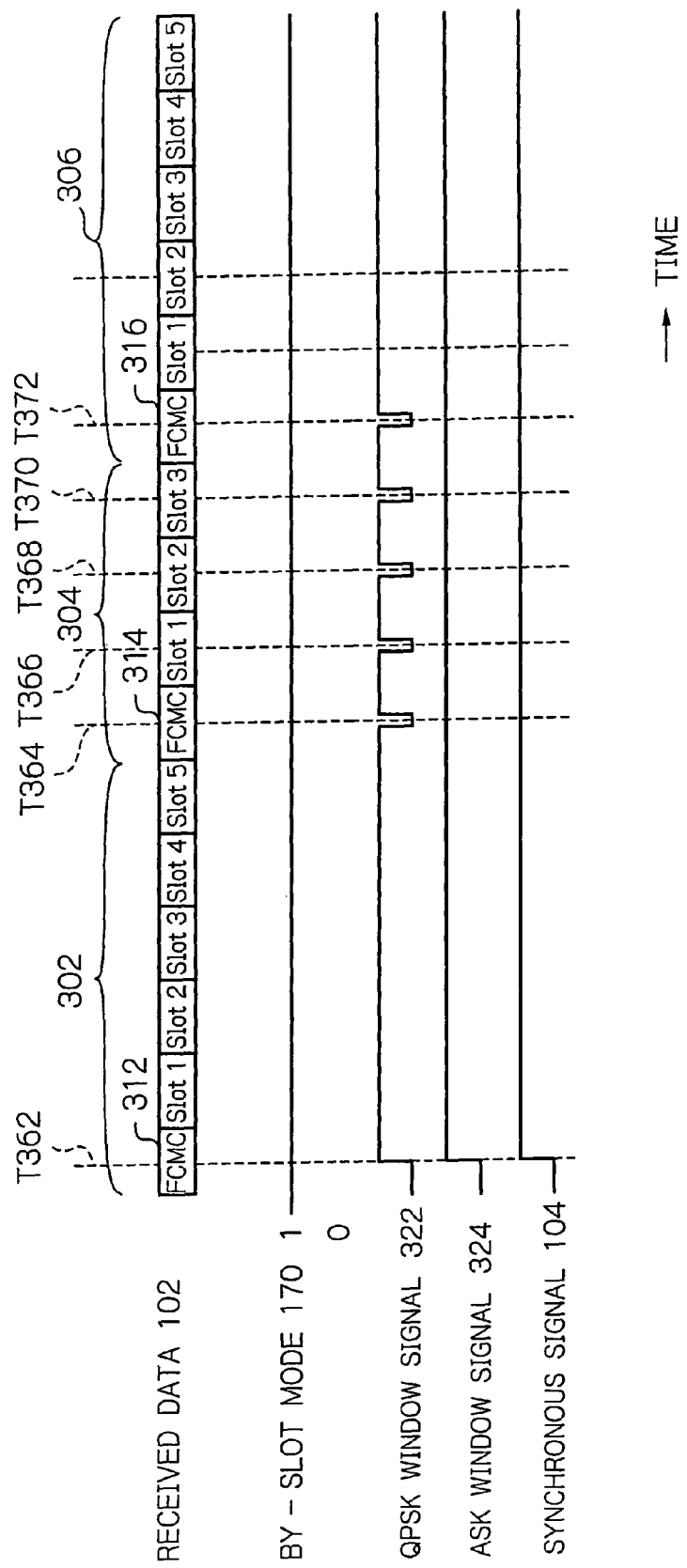

Next, in accordance with the instant alternative embodiment of the frame synchronous circuit 10 in the DSRC system, an operation for generating a UW window signal when the by-slot mode is set will be described with reference to a timing chart shown in FIG. 9. Now, the by-slot mode is set in the operation setting register group 3 via the CPU or terminal and the value in the synchronization continuation number register 22 is set as "1" or more.

In this operational example, the synchronous circuit 10 receives data similar to that in the aforementioned example where the by-slot mode is not set. The circuit 10 therefore establishes synchronization at a time T362 in response to the FCMC data 312 of the five-slot frame 302, and then analyzes the data 312 to obtain the operational information 118, in which the time-sharing mode is "True" and the number of slots is five. The information 118 is then set in the register group 3.

Furthermore, the synchronous manager 4 generates, as in the case where the by-slot mode is not set, the QPSK window signal 322 on the basis of the operational information 124 of the register group 3. In the frame 302 where the synchronization is detected, a perch window is open at a timing T364 where all of the slots defined in number by the information 124 have passed on, i.e. after five slots have passed on.

When a UW word is not detected from the FCMC data 314 in the subsequent frame 304 at the timing T364, since the by-slot mode is set in this case, the QPSK window signal 322 is generated such that a perch window is open slot by slot at times T366, T368, T370 and T372.

Furthermore, if the perch window is open slot by slot, a UW word contained in FCMC data 316 of the following frame 306 is detected at the proper detection timing, that is, detected at the timing T372 where three slots pass on, and thereby the synchronization is established. The FCMC data analyzer 6 analyzes the FCMC data 316 to set the operation setting register group 3 with the operational information 118 as a result of analysis.

Consequently, the synchronous manager 4 generates another QPSK window signal 322 based on the operational information 124, in which the perch window is open at the timing that all slots pass on.

In this manner, when the UW contained in a certain frame is not detected in the frame synchronous signal 102, in which the frames are different in length and transmitted in the time-sharing manner, the UW window signal 126 is then generated in such a way that the perch window is open slot by slot. Therefore, a UW word in a subsequent frame can be detected without missing it, so that the loss in transmission is reduced. That is to say, the loss in transmission can be eliminated while the UW word contained in the first frame, to which synchronization was made, is detected again.

In addition, the perch window is not open at the wrong timing, so that resynchronization difficulties are prevented from being raised when a data pattern identical with a UW pattern is detected in the received data stream.

Figure 10:
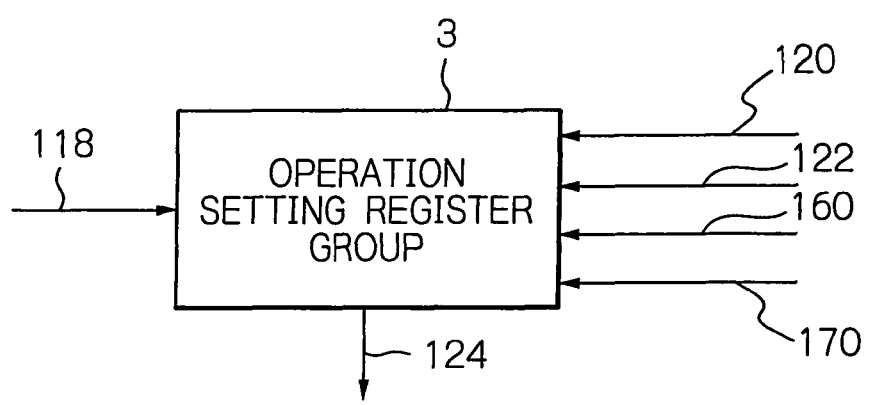
FIG. 10 is a schematic block diagram showing an operation setting register group of a sixth embodiment of the frame synchronous circuit in accordance with the present invention.

FIG. 10 shows a further alternative, sixth embodiment of the frame synchronous circuit 10, of which the configuration may be similar to that of any of the first, second and third embodiments. Its detailed description will therefore be described with reference to the circuitry of the first embodiment. Incidentally, the repetitive descriptions of the constituent elements corresponding to those of the first embodiment will be omitted.

In this alternative embodiment, the synchronous circuit 10 is operable by setting both of the both-mode signal in the fourth embodiment and the by-slot mode signal in the fifth embodiment and has the functions of the combination of those in the fourth and fifth embodiments. The circuit 10 may be provided with the both-mode register or terminal of the fourth embodiment and the by-slot mode register or terminal of the fifth embodiment.

The synchronous circuit 10 is adapted to synchronize with a certain frame when both of the both-mode and by-slot mode are set, and generates, if a UW word is not detected in the following frame, UW window signals in the modulation schemes both in and out of synchronization, in which a perch window is open at a timing of each subsequent slot.

The operation setting register group 3 of this alternative embodiment is set by, as shown in FIG. 10, writing the both-mode signal 160 and the by-slot mode signal 170 there into, respectively via the both-mode register or the terminal and the by-slot mode register or the terminal.

Figure 11:
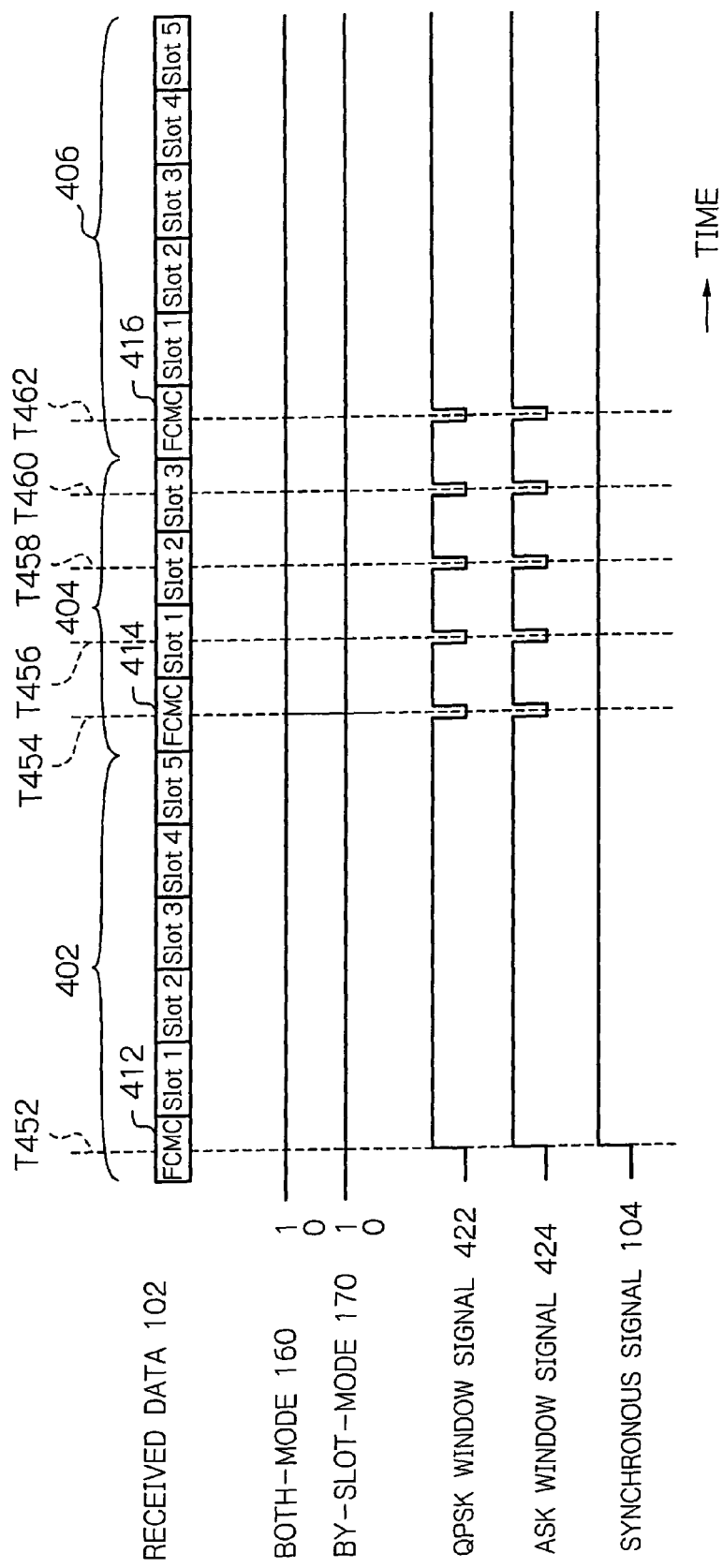
FIG. 11 is a timing chart useful for understanding an operational example of the frame synchronous circuit shown in FIG. 10.

In accordance with the alternative embodiment of the frame synchronous circuit 10 in the DSRC system, an operation for generating a UW window signal when the both-mode and by-slot mode are set will now be described with reference to a timing chart shown in FIG. 11. Here, the both-mode and by-slot mode are set in the operation setting register group 3 by an input means such as the CPU or terminal of the system.

To the synchronous circuit 10, the QPSK frame and ASK frame included in the data stream 102 are alternately transmitted from the roadside unit in the time-sharing manner, in which the length of each frame is different. For example, a QPSK frame 402 with five slots and an ASK frame 404 with three slots are transmitted alternately. In the circuit 10, a QPSK window signal 422 and an ASK window signal 424 are generated as the UW window signals 126.

The on-board unit incorporating the circuit 10 first receives FCMC data 412 contained in the QPSK frame 402. Then a UW word of the received data 412 is detected at a time T452, and the on-board unit thus goes into synchronization. Furthermore, the FCMC data analyzer 6 analyzes the FCMC data 412 so as to set in the operation setting register group 3 the operational information 118 in which the time-sharing mode is "True" and the number of slots is five.

At this time, the synchronous manager 4 generates the UW window signal 126 on the basis of the operational information 124 set in the register group 3. As the register group 3 is set with the both-mode signal 160, the manger 4 generates not only the QPSK window signal 422 but also the ASK window signal 424 in such a way that a perch window is open at a UW detection timing T454 where five slots have passed on.

When a UW word is not detected from FCMC data 414 in the following ASK frame 404 at the timing T454, as the by-slot mode 170 is set in this case, the window signal 422 in the QPSK scheme currently synchronized therewith is generated such that a perch window is open slot by slot at times T456, T458, T460 and T462. Since the both-mode 160 is also set in this case, the window signal 424 in the ASK scheme not in synchronization with is generated such that a perch window is open slot by slot at the times T456, T458, T460 and T462.

In this manner, if the perch window is open slot by slot, a UW word contained in FCMC data 416 of the following QPSK frame 406 is detected at the proper UW detection timing, that is, detected at the timing T462 where three slots pass on. The FCMC data analyzer 6 analyzes the FCMC data 416 so as to set the operation setting register group 3 with the operational information 118 as a result of analysis.

Consequently, the synchronous manager 4 generates other QPSK window signal 422 and ASK window signal 424 on the basis of the operational information 124, in each of which the perch window is open at the timing that all slots pass on.

In the illustrative embodiment, even if the frame synchronous signal 102 is transmitted in the time-sharing manner, in which frames are different in modulation scheme and in length, when the UW word is not detected, the UW window signals in both modulation schemes are then generated such that the perch window is open slot by slot. Therefore, a UW word in a subsequent frame can be detected without missing it, thereby reducing the loss in transmission.

Figure 12:
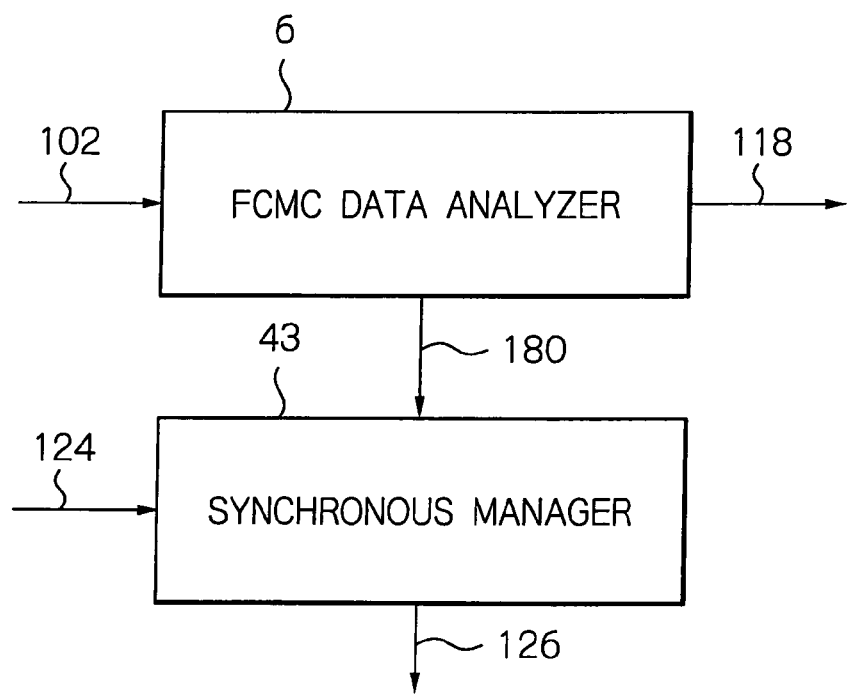
FIG. 12 is a schematic block diagram showing an FCMC data analyzer of a seventh embodiment of the frame synchronous circuit in accordance with the present invention.

FIG. 12 shows a still alternative, seventh embodiment of the frame synchronous circuit 10, of which the configuration may be similar to that of any of the first to sixth embodiments. Its detailed description will therefore be described with reference to the circuitry of the first embodiment. Incidentally, the repetitive descriptions of the constituent elements corresponding to those of the first embodiment will be omitted.

In this alternative embodiment of the synchronous circuit 10, as shown in FIG. 12, the synchronization manger 4 is replaced by a synchronous manager 43 to which an FCMC discrepancy detection signal is input. The FCMC data analyzer 6 determines the FCMC data 102 to detect discrepancies from the data, thereby generating an FCMC discrepancy detection signal 180 to feed the signal to the synchronous manager 43. The manager 43, in turn, generates the UW window signal 126 based on the detection signal 180.

The FCMC data analyzer 6 is adapted to analyze the received FCMC data 102 to retrieve the operational information 118 and set the obtained information in the operation setting register group 3. In this embodiment, the analyzer 6 determines if there is any discrepancy in the contents of the data 102 and generates the FCMC discrepancy detection signal 180 representing "1" when a discrepancy is detected, or otherwise "0".

In the DSRC standard, i.e. the Standard ARIB STD-T75, when a communication mode is a full-duplex mode, for instance, the number of slots is up to four, and as to a half-duplex mode, the number is eight at a maximum. Further, in this standard, when a physical profile is given with value "0" or "1", the FCMC slots and other slots are transmitted using the ASK modulation scheme, and when the profile is given with value "2", the FCMC slots are transmitted in the ASK scheme while the other slots are transmitted in the QPSK scheme. When the given value is "3", the FCMC slots and other slots are transmitted in the QPSK scheme.

According to such standard, the FCMC data analyzer 6 retrieves from the FCMC data 102, for example, information concerning the communication mode and the number of slots, and if the communication mode is the full-duplex mode and the number of slots is larger than four, then detects a discrepancy in the data to thereby generate the FCMC discrepancy detection signal 180 representing the presence of the discrepancy. The analyzer 6 also retrieves information concerning the modulation scheme and the physical profile from the data 102, and if the modulation scheme is ASK and the physical profile is equal to three, then detects a discrepancy in the data to thereby generate the detection signal 180 indicative of the presence of the discrepancy. Moreover, the analyzer 6 generates the detection signal 180 when it detects any discrepancies in the contents of the data 102.

When the FCMC data analyzer 6 sends the FCMC discrepancy detection signal 180 noticing the presence of the discrepancy to the synchronous manager 43, the manger 43 cancels the synchronization if the on-board unit is in the synchronous state so as to supply the UW detector 1 with the synchronous signal 104 which represents a synchronism. The manager 43 also generates, on the basis of the discrepancy detection signal 180, the UW window signal 126 in which a perch window is open. The manager 43 may generate the UW window signal 126 in which the perch window is kept open until a UW word is detected from the FCMC data 102 and the detection signal 180, indicating that the data 102 has no discrepancies, is supplied as a result of the discrepancy detection. Furthermore, it is preferable to open the perch windows for all modulation schemes.

Next, in accordance with the present alternative embodiment of the frame synchronous circuit 10 in the DSRC system, an operation for generating a UW window signal will be described with reference to a timing chart in FIG. 13.

The on-board unit incorporating the circuit 10 receives the data 102 sent from the roadside unit. When the circuit 10 receives FCMC data 512 of a certain frame 502 in the data stream 102, the UW detector 1 detects a UW word in the FCMC data 512 at a time T552, so that the on-board unit goes into synchronization. Particularly in the alternative embodiment, when the synchronization is initiated or when the circuit 10 receives FCMC data 514 included in a subsequent frame 504, the FCMC data analyzer 6 analyzes the received FCMC data.

At a time T554, the FCMC data analyzer 6 analyzes the FCMC data 512 in the synchronous state. When detecting a discrepancy in the contents of the data 512, the analyzer 6 then generates the FCMC discrepancy detection signal 180 indicative of the presence of the discrepancy and delivers the signal to the synchronous manager 43.

The synchronous manager 43 cancels the synchronization in response to the detection signal 180 representing the discrepancy presence and generates the synchronous signal 104 indicating a synchronism to supply the signal 104 to the detector 1. In addition, the manager 43 may generate, in response to the detection signal 180, the UW window signals 126 for all modulation schemes in such a way that the perch windows in the signals 126 are kept open until another detection signal 180 representing consistency of the data is supplied.

Then the synchronous circuit 10 uses, regardless of the modulation scheme of QPSK or ASK, the modulation scheme of the first detected UW word to thereby establish synchronization and, in the illustrative embodiment, the UW detector 1 subsequently detects a UW word from the FCMC data 514 at a time T556.

At the time T556, the UW detector 1 supplies the synchronous manager 43 with the synchronous detection signal 106 which indicates the detection of the UW word, and the synchronous manager 43 then makes the perch window opened in the UW window signal 126 with respect to the synchronized modulation scheme.

Furthermore, the FCMC data analyzer 6 analyzes the FCMC data 514 at a time T558. When no discrepancy is detected in the data, the analyzer 6 generates the FCMC discrepancy detection signal 180 indicating that the discrepancy is not present and supplies the manager 43 with the generated signal.

In this way, when the on-board unit cannot operate properly due to the discrepancy in the FCMC data 102 even though the on-board unit can be synchronized with the roadside unit upon the successful detection of the UW word from the data 102 sent by the roadside unit, that is to say, when the roadside unit sends the discrepant data, the circuit 10 mounted on the on-board unit cancels the synchronization so as to disrupt the communication with the roadside unit. The circuit 10 then opens the perch window in the UW window signals 126 in the QPSK and ASK schemes, thereby searching efficiently for another device to communicate with, i.e. other roadside unit.

A still further alternative, eighth embodiment of the frame synchronous circuit 10 has a configuration that may be similar to that of any of the first to seventh embodiments. Its detailed description will therefore be described with reference to the circuitry of the first embodiment. The repetitive descriptions of the constituent elements corresponding to those of the first embodiment will be omitted.

In this alternative embodiment, the synchronous manager 4 generates a monitor signal on the basis of the operational information 124. In addition, the synchronous circuit 10 utilizes a part of the manager 4 as a monitor circuit to implement the function of monitor signal generating means, not specifically shown.

The synchronous manager 4 can generate the synchronous signal 104 which may represent the synchronous state by logical "1" and the asynchronous state by logical "0", or vice versa. The manager 4 may have a monitor circuit for generating the synchronous signal 104 as an internal monitoring signal. Moreover, the monitor circuit may include an LSI (Large Scale Integration) terminal for outputting the synchronous signal 104 in test mode.

The synchronous manager 4 can also generate a frame end signal 622 indicative of the end of a frame as well as a slot end signal 624 indicative of the end of a slot. Furthermore, the manager 4 may have circuits for respectively generating the frame end signal 622 and the slot end signal 624 as respective internal monitoring signals, and each of circuits may be the LSI terminal for outputting corresponding one of the frame end signal 622 and the slot end signal 624.

In the synchronous state, the synchronous manager 4 generates, for example, the frame end signal 622 and slot end signal 624 depending on the number of slots and number of received bits specified in the operational information 124. The manager 4 may output the frame end signal 622 and the slot end signal 624 as the test mode signals on the LSI terminals.

In accordance with the instant alternative embodiment of the frame synchronous circuit 10 in the DSRC system, an operation for generating a monitor signal will now be described with reference to a timing chart shown in FIG. 14.

The on-board unit incorporating the synchronous circuit 10 receives the data 102 sent out from the roadside unit. When the synchronous circuit 10 receives FCMC data 612 of a certain frame 602 in the data stream 102, the UW detector 1 detects a UW word in the FCMC data 612 at a time T652 to thereby supply the synchronous manager 4 with the synchronous detection signal 106 indicative of the detection of the UW word. Furthermore, the FCMC data analyzer 6 analyzes the FCMC data 612, whereby the operational information 118 is obtained and set to the operation setting register group 3.

Especially in the instant alternative embodiment, the synchronous manager 4 generates the synchronous detection signal 106 and the monitor signal on the basis of the operational information 124 set in the register group 3.

The synchronous manager 4 generates the synchronous signal 104 based on the synchronous detection signal 106 representing the UW detection such that the signal 104 is changed to "1" at the time T652, and delivers the signal 104 to the UW detector 1. The slot end signal 624 is generated in the form of pulse each time bits have passed on, of which the number is defined by the operational information 124 received upon the detection of synchronization, in such a manner that the pulse has its positive-going edge at times T654, T656, T658 and T660. The slot end signal 624 is generated in the form of pulse upon all of the slots, of which the number is defined by the operational information 124 received upon the detection of synchronization, having passed through in such a manner that the pulse has its positive-going edge at time T660.

Furthermore, the synchronous manager 4 can, for example, generate an inactive pulse for the active synchronous signal 104 at the frame end position and slot end position, thereby performing an AND operation of the synchronous signal 104 with the frame end signal 622 and slot end signal 624 so as to generate a frame end monitoring synchronous signal 626 and a slot end monitoring synchronous signal 628.

After that, each time the UW detector 1 detects a UW word in FCMC data 614, 616 and 618 at times T662, T664 and T666, respectively, the synchronous manager 4 generates the monitor signal on the basis of the synchronous detection signal 106 and the operational information 124.

As described, since the synchronous manager 4 includes the monitor circuit to output the monitor signal, the internal operation of the on-board unit, communicating with the roadside unit on receiving the FCMC data, can be monitored by using the monitor signal during an analysis or a test. Alternatively, the monitor signal may be used as a trigger for observing waveforms with a logic analyzer or an oscilloscope to perform, such as, a debug operation when measuring a delay value in the internal signal or if the on-board unit does not operate properly.

The frame synchronous circuit of the present invention is appropriately applicable to any types of on-board unit for communicating with a roadside unit using a DSRC system.

The entire disclosure of Japanese patent application No. 2006-206674 filed on Jul. 28, 2006, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A frame synchronous circuit for use in a dedicated short-range communication system applicable to a plurality of modulation schemes to transmit data between a roadside unit and a controlled device for controlling synchronization of the controlled device, comprising:

a synchronous word detector for detecting a synchronous word from data received from the roadside unit;

an FCMC (Frame Control Message Channel) data analyzer for analyzing the received data to retrieve first operational information from FCMC data included in the received data;

an operation setting register group for setting the first operational information obtained by said FCMC data analyzer; and a synchronous manager for read out the first operational information from said operation setting register group and for controlling a synchronous state, said synchronous manager operative in response to the first operational information for generating a window signal for opening a window at a timing where the synchronous word is to be detected to supply the window signal to said synchronous word detector, said synchronous word detector being responsive to the window signal to refrain, when the window is not open, from detecting the synchronous word, said circuit further comprising input circuitry for receiving a control signal from a central processing unit (CPU) which controls said controlled device or from a terminal provided to said circuit, whereby said circuit controls the synchronization by the control signal.

2. The circuit in accordance with claim 1, wherein said operation setting register group sets second operational information as the control signal by said input circuitry;

said synchronous manager reading out the second operational information from said operation setting register group to generate the window signal based on the second operational information.

3. The circuit in accordance with claim 2, wherein said operation setting register group sets a CPU control mode set signal as the control signal by said input circuitry so that the second operational signal can be set only when the CPU control mode is set by the set signal.

4. The circuit in accordance with claim 1, wherein said synchronous manager, when receiving as the control signal an unlimited synchronization continuation signal from said input circuitry and unlimited continuation of synchronization is set by an input signal, continues the synchronization without limitation once said circuit establishes the synchronization.

5. The circuit in accordance with claim 1, wherein said synchronous manager, when receiving as the control signal a forced synchronization mode signal from said input circuitry and a forced synchronization mode is set by an input signal, establishes the synchronization forcibly, regardless of another condition.

6. The circuit in accordance with claim 1, wherein said synchronous manager, when receiving as the control signal a synchronization cancellation signal from said input circuitry and a forced cancellation mode is set by an input signal, cancels the synchronization forcibly, regardless of another condition.

7. The circuit in accordance with claim 1, wherein said operation setting register group sets a both-mode signal as the control signal by said input circuitry;

said synchronous manager reading out the both-mode signal from said operation setting register group, and generating, when the both-mode is set, the window signal not only in a currently synchronized modulation scheme but also in another modulation scheme not in synchronization therewith so that the window is open at a timing where the synchronous word is to be detected.

8. The circuit in accordance with claim 1, wherein said operation setting register group sets a by-slot mode signal as the control signal by said input circuitry;

said synchronous manager normally generating the window signal for opening the window at a timing in each frame where to detect the synchronous word, said synchronous manager reading out the by-slot mode signal from said operation setting register group, and generating, when the by-slot mode is set, the window signal for opening the window at a timing in each slot in a predetermined frame where to detect the synchronous word if said synchronous word detector fails to detect the synchronous word in the predetermined frame.

9. The circuit in accordance with claim 1, wherein said FCMC data analyzer analyzes the FCMC data and, when detecting a discrepancy in a content of the data, generates an FCMC discrepancy detection signal indicating a presence of the discrepancy to supply the FCMC discrepancy detection signal to said synchronous manager;

said synchronous manager cancelling the synchronization, regardless of another condition, when the FCMC discrepancy detection signal represents the presence of the discrepancy.

10. The circuit in accordance with claim 1, wherein said synchronous manager generates and outputs as a monitor signal a first signal representing the synchronous state, a second signal representing an end of a frame and a third signal representing an end of a slot.

11. The circuit in accordance with claim 1, wherein the controlled device is an on-board unit communicating with the roadside unit.

* * * * *